United States Patent
Sargeant et al.

[19]

[11] Patent Number: 6,042,967
[45] Date of Patent: Mar. 28, 2000

[54] END CAP SEAL ASSEMBLY FOR AN ELECTROCHEMICAL CELL

[75] Inventors: Sean A. Sargeant, Westford; William H. Gardner, North Easton, both of Mass.

[73] Assignee: Duracell Inc, Bethel, Conn.

[21] Appl. No.: 09/124,319

[22] Filed: Jul. 29, 1998

[51] Int. Cl.$^7$ .................................................. H01M 2/02
[52] U.S. Cl. .......................... 429/164; 429/163; 429/174; 429/185; 429/57
[58] Field of Search .................................... 429/185, 171, 429/172, 174, 163, 164, 175, 56, 82, 57

[56] References Cited

U.S. PATENT DOCUMENTS

| | | | |
|---|---|---|---|
| 3,617,386 | 11/1971 | Bosben et al. | 136/107 |
| 4,052,537 | 10/1977 | Mallory | 429/174 |
| 4,537,841 | 8/1985 | Wiacek et al. | 429/56 |
| 4,670,362 | 6/1987 | Wiacek et al. | 429/174 |
| 5,080,985 | 1/1992 | Wiacek et al. | 429/172 |
| 5,150,602 | 9/1992 | Payne et al. | 29/623.2 |
| 5,248,568 | 9/1993 | Getz | 459/56 |
| 5,532,081 | 7/1996 | DePalma et al. | 429/171 |
| 5,589,293 | 12/1996 | Pope et al. | 429/172 |
| 5,766,791 | 6/1998 | Takahashi et al. | 429/57 |
| 5,821,010 | 10/1998 | Taylor | 429/172 |
| 5,876,868 | 3/1999 | Tanida | 429/56 |
| 5,935,731 | 8/1999 | Nagaura | 429/174 |

*Primary Examiner*—Maria Nuzzolillo
*Assistant Examiner*—Raymond Alejandro
*Attorney, Agent, or Firm*—Barry D. Josephs; Paul I. Douglas; Thomas D. Kivulka

[57] ABSTRACT

An end cap assembly is disclosed for sealing the open end of a cylindrical alkaline cell housing preferably having a diameter less than the diameter of AAA size cells. The end cap assembly is preferably intended for sealing AAAA (LR61) size cylindrical alkaline cells. The end cap assembly comprises a terminal end cap, an insulating sealing disk underlying said end cap, and an elongated current collector penetrating through an aperture in said insulating sealing disk. At least a portion of the insulating sealing disk lies within the cell housing to seal the open end thereof. The terminal end cap has a peripheral edge, preferably formed from a curved rib, which is locked within the peripheral edge of the insulating sealing disk. The end cap assembly does not require other metal disks held within the sealing and insulating disk. The insulating disk comprises a discontinuous skirt comprising a plurality of integral legs emanating downwardly into the cell interior from the peripheral edge of said insulating disk. The insulating sealing disk has an integrally formed rupturable membrane therein. The membrane ruptures when gas pressure within the cell exceeds a predetermined level.

33 Claims, 4 Drawing Sheets

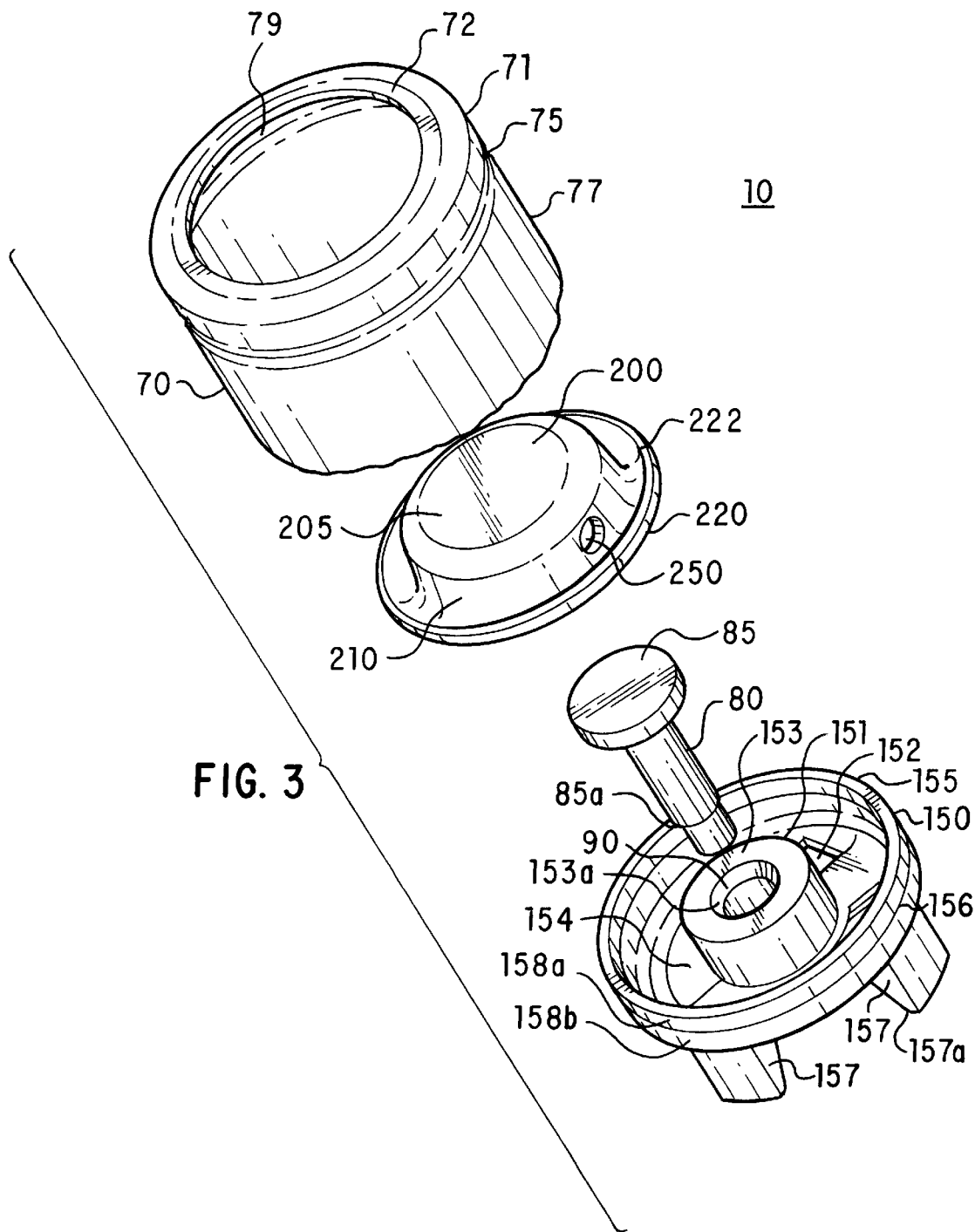

END CAP SEAL ASSEMBLY FOR AN ELECTROCHEMICAL CELL

FIELD OF THE INVENTION

The invention relates to an end cap assembly for sealing small diameter alkaline electrochemical cells, particularly AAAA (LR61) size alkaline cells. The invention relates to rupturable devices within the end cap assembly which allow gas to escape from the interior of the cell.

BACKGROUND

Conventional alkaline electrochemical cells are formed of a cylindrical housing having an open end. The housing is initially formed with an enlarged open end. After the cell contents are supplied, the cell is closed by crimping the housing edge over an edge of the end cap assembly and radially compressing the housing around the assembly to provide a tight seal. The end cap assembly comprises an exposed terminal end cap plate and typically a plastic insulating member which forms a plug at the open end of the housing and insulates the terminal end cap plate from the cell housing. A problem associated with design of alkaline cells is the tendency of the cell to produce gases as it continues to discharge beyond a certain point, normally around the point of complete exhaustion of the cell's useful capacity. Alkaline cells are conventionally provided with a rupturable member such as a diaphragm or membrane within the end cap assembly, for example, as described in U.S. Pat. No. 3,617,386. Such diaphragms or membranes are designed to rupture when gas pressure within the cell exceeds a predetermined level. The end cap assembly may be provided with vent holes for the gas to escape when the diaphragm or membrane is ruptured. The end cap assembly disclosed in U.S. Pat. No. 3,617,386 takes up considerable space, which reduces the amount of available space within the cell for active material.

In order to provide a tight seal alkaline cells have end cap assemblies which include a metal support disk inserted in a cavity within the plastic insulating member. The metal support disk is a separate member apart from the terminal end cap plate. The metal support disk may have a convoluted surface as shown in U.S. Pat. Nos. 5,532,081 or 5,080,985 which assures that end cap assembly can withstand high radial compressive forces during crimping of the cell's housing around the end cap assembly. Such support disk allows high radial forces to be applied during crimping. This results in a tight mechanical seal around the end cap assembly at all times. Such designs, however, can occupy additional space within the cell and can markedly increase the complexity of fabrication, particularly if applied to very small cells.

U.S. Pat. No. 4,670,362 discloses a plastic insulating disk which is snap fitted into the open end of a cylindrical casing for an alkaline cell. The disclosed insulating disk does not comprise nylon. The insulating disk disclosed in this reference is not contemplated for use in very small size cells, e.g., AAAA alkaline cells. The disclosed snap fitted insulating disk requires additional force for insertion into the open end of a cylindrical casing. Any additional force required for insertion of the insulating disk becomes a disadvantage in sealing very small diameter cells, e.g., AAAA size alkaline cells, because of the difficulty in handling such smaller cells.

A rupturable vent membrane may be integrally formed as part of the plastic insulating member included within the end cap assembly. Such vent membrane may typically be of circular shape as shown in U.S. Pat. No. 4,537,841. This reference discloses a discontinuous skirt emanating from the base of the insulating member and requires a separate metal support disk held in place within a cavity in the insulating member. As shown in this reference the rupturable membrane may be integrally formed as a thin portion of the plastic insulating member. The rupturable membrane may also take the form of a grooved or circumferential configuration as disclosed in U.S. Pat. No. 5,080,985. Methods of crimping the housing around the insulating member is disclosed in U.S. Pat. No. 5,150,602.

A problem associated with the design of end cap assemblies for AAAA alkaline cells is that any plastic insulating disk employed to seal the cell is of necessity very small diameter corresponding to the small cell diameter. Because such disks are very small, they may be more prone to cracking than plastic insulating disks for larger size cells, particularly when radial compressive forces are applied.

SUMMARY OF THE INVENTION

The invention is directed to an end cap assembly, preferably for small diameter cylindrical alkaline cells. The end cap assembly is inserted into the open end of the housing for the cell. The invention is directed to end cap assemblies, preferably for cylindrical alkaline cells having a diameter less than the diameter of AAA size cells (less than about 10 millimeters, desirably a diameter between about 7 and 9 millimeters). In one preferred embodiment the invention is directed to an end cap assembly for AAAA (Quad A) cells (IEC designation "LR61" cells). Such cells have a diameter of between about 7.7 and 8.3 millimeters and a length of between about 41.5 and 42.5 millimeters.

It has been determined that for very small cylindrical alkaline cells, namely, cells having a cylindrical cell housing of diameter less than the diameter of an AAA cell housing, and particularly the diameter for AAAA (LR61) cell housing, a sufficiently tight seal may be obtained without including a separate metal support disk within the cell housing, apart from the end cap. In particular it has been determined that there is no need to employ a separate metal support disk (irrespective of whether it is flat or convoluted), apart from the end cap, anywhere within the cell housing. Instead, a sufficiently tight seal may be provided for such small cylindrical alkaline cells at the open end thereof, e.g., AAAA (LR61) cells, by employing an end cap assembly comprising essentially two members, namely, a single plastic insulating sealing disk (with current collector therethrough) having an upwardly extending peripheral edge and a terminal end cap having a peripheral edge which locks into, preferably, bites into the inside surface of the peripheral edge of sealing disk. The terminal end cap is desirably "hat shaped" having a flat central portion which terminates in a downwardly extending wall. The downwardly extending wall is angled outwardly from vertical. The downwardly extending wall of the end cap terminates in an inwardly curved (concave) rib when the cell is viewed while looking down with the end cap on top. The inwardly curved rib terminates in an upwardly extending wall which terminates in a peripheral edge of the end cap which preferably bites into the inside surface of the peripheral edge of the insulating sealing disk.

The insulating sealing disk may have a circumferential skirt extending downwardly from the edge of the disk and in the direction of the cell interior. The skirt is preferably discontinuous thus forming a plurality of individual legs which are desirably spaced apart from each other at equal distances. Preferably there are four legs which are equally spaced from each other and extending downwardly from the edge of the insulating disk. Each leg is preferably identical and extends towards the cell interior. The individual spaced apart legs have been determined to provide added flexibility to the insulating disk so that it may better withstand radial compressive forces applied during crimping and build-up of gas pressure from within the cell, without cracking.

The midsection region of the insulating sealing disk has at least one thinned portion which forms a rupturable membrane. The rupturable membrane is preferably in the form of a truncated sector of a circle or a circle. The rupturable membrane may be of other configuration, for example, oval, rectangular, parallelepiped or polygonal or in the form of straight or arcuate grooves. The membrane ruptures when gas pressure with the cell reaches a predetermined level.

It has been determined that the end cap assembly, even though it does not contain a separate metal support disk, apart from the end cap, provides a sufficiently tight seal even though the cell may be subjected to extremes in hot or cold ambient conditions. The curved rib at the peripheral edge of the end cap functions as radial spring wherein sufficient radial forces are maintained to provide a tight seal at all times. The end cap assembly of the invention occupies less space within the cell than end cap assemblies which include a separate metal support disk held in place by the insulating and sealing disk.

BRIEF DESCRIPTION OF THE DRAWINGS

The invention is more fully described with reference to the drawings in which:

FIG. 3 is an exploded view of the components comprising the end cap assembly shown in FIGS. 1 and 2.

DETAILED DESCRIPTION

The end cap assembly 10 of the invention (FIGS. 1–3) is suitable for application to cylindrical alkaline cells, preferably having a housing diameter less than the diameter of AAA size cell housing, that is, less than about 10 millimeters, desirably a housing outside diameter between about 7 and 9 millimeters. The end cap assembly 10 of the invention is particularly suitable for application to cylindrical AAAA size alkaline cells. Such cells can have a housing outside diameter typically between about 7.7 and 8.3 millimeters. This, of course, is not to say that such end cap assembly can not be used in larger cell sizes, depending upon the strength of the plastic and/or the expected internal pressure.

Figure 1:
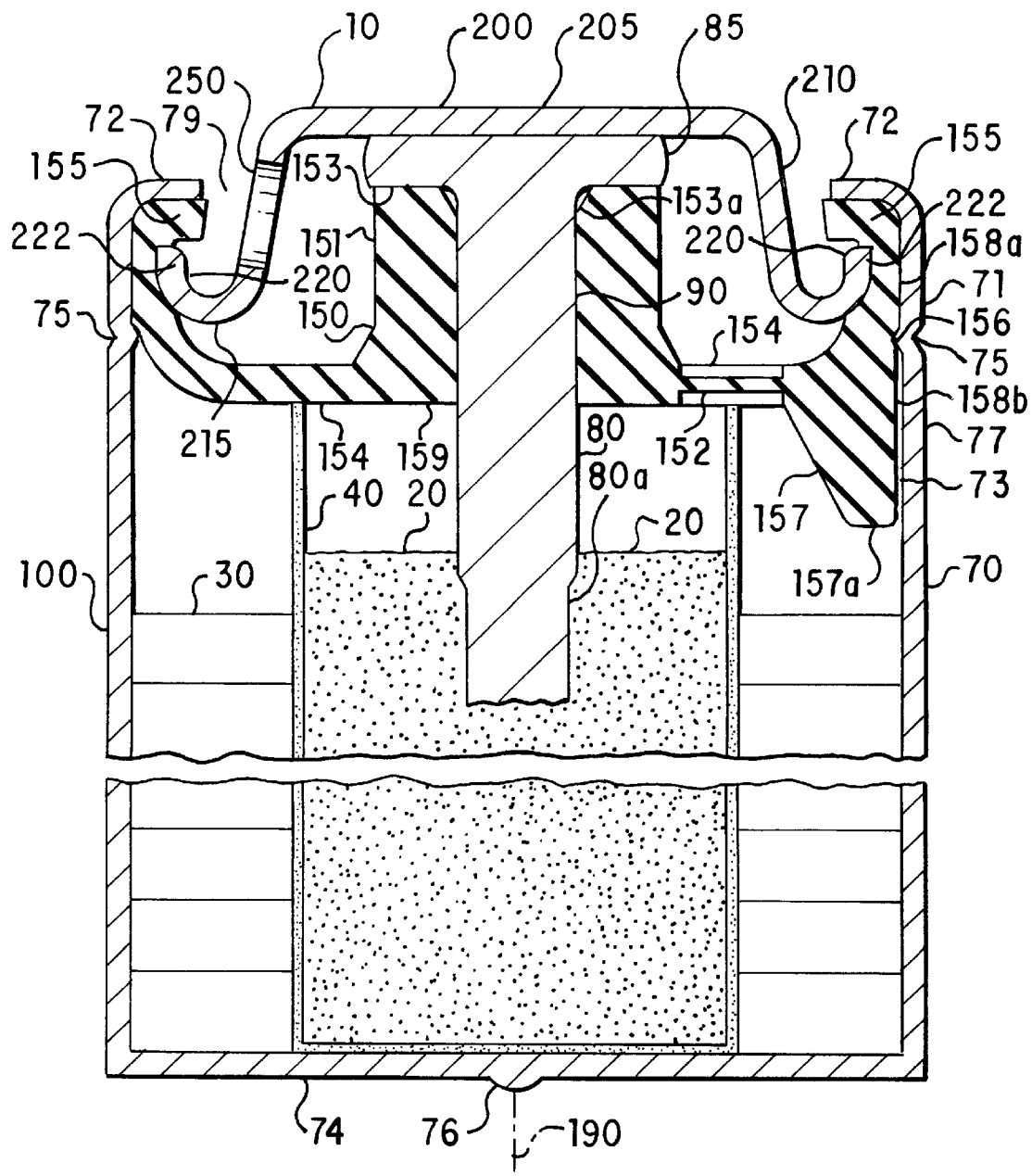
FIG. 1 is a cross sectional view of a specific embodiment of the end cap assembly of the invention sealed within the open end of an AAAA (LR61) alkaline cell taken along sight lines 1—1 of FIG. 2A.
Figure 2:
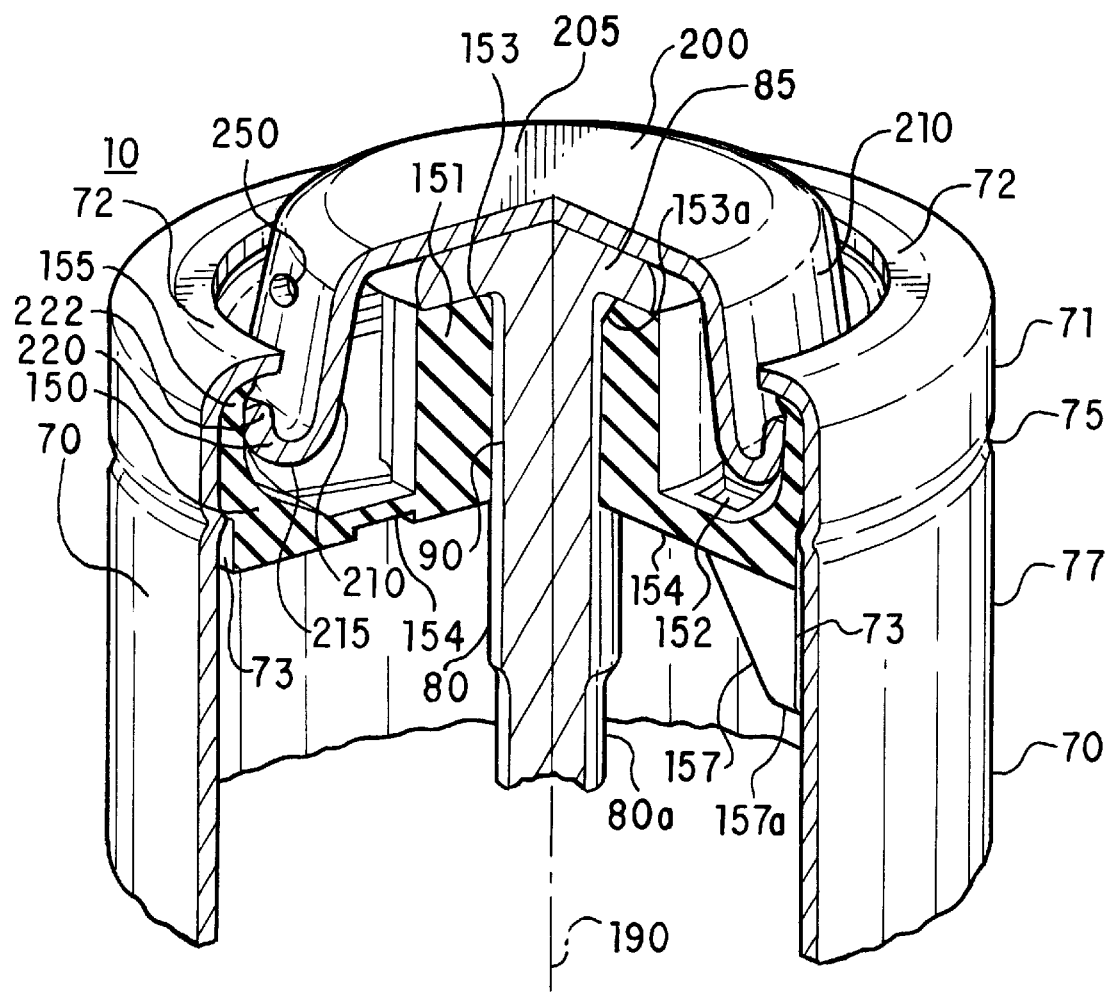
FIG. 2 is a cut-away view in perspective of the end cap assembly shown in FIG. 1.

A specific embodiment of the end cap assembly 10 of the invention preferred for the AAAA (Quad A) alkaline cell 100 is shown in FIGS. 1–3. (The AAAA cell is cross referenced by American National Standards Institute (ANSI) as "25A" cell and in Europe by the International Electrotechnical Commission (IEC) designation "LR61" cell.) The AAAA (LR61) alkaline cell 100 (FIG. 1) is a cylindrical cell comprising a cylindrical housing 70 of length of between about 41.5 and 42.5 millimeters and outside diameter of between about 7.7 and 8.3 millimeters. The housing 70 wall thickness may be between about 0.1 mm and 0.25 mm. The AAAA (LR61) cell 100 may employ alkaline cell anode, cathode, and electrolyte chemistries and separator material conventionally employed in larger cells, for example, AA or C and D cells. Thus, cell 100 may have an anode 20 comprising zinc, a cathode 30 comprising compacted manganese dioxide, and an electrolyte within the anode comprising potassium hydroxide. Additives may be employed, as conventional, to modify the cell chemistry. The alkaline cell may employ a conventional alkaline cell ion porous separator material 40, typically comprising rayon or cellulose. The end cap assembly 10 of the invention is not intended to be restricted to any particular alkaline cell chemistry and/or alkaline cell size. The end cap assembly 10 of the invention in one preferred embodiment is intended for application to AAAA (LR61) size alkaline cells employing conventional alkaline cell chemistries and modifications thereof. Such representative chemistries, for example, is disclosed in U.S. Pat. No. 5,401,590, herein incorporated by reference.

The end cap assembly shown in FIGS. 1, 2, 2A and 3 comprises an insulating sealing disk 150, a terminal end cap 200, and an elongated current collector 80. End cap 200 forms the negative terminal of AAAA alkaline cell 100 (FIG. 2) (The description herein is made with reference to the figures which show the end cap assembly 10 when viewed with the cell oriented in vertical position with the end cap assembly 10 on top.) The terminal end cap 200 is preferably "hat shaped" having a flat central portion 205 which terminates in a downwardly extending wall 210. The downwardly extending wall 210 is angled outwardly from vertical as shown in FIGS. 1 and 2. Downwardly extending wall 210 terminates in an inwardly curved (concave) rib 215, when the cell is viewed while looking down with the end cap 200 on top. Inwardly curved rib 215 terminates in an upwardly extending wall 220 which terminates in peripheral edge 222 of end cap 200.

Insulating disk 150 has a thick central section which forms boss 151 which has a central aperture 90 therethrough. Central aperture 90 is provided for insertion therein of metallic current collector 80. Aperture 90 is slightly enlarged at the inlet end 153a and current collector 80 is slightly narrowed at its bottom portion 85A to allow for easy insertion of the lead portion 80a of current collector 80. The head 85 of current collector 80 is desirably welded to the bottom surface of the flat central portion 205 of end cap 200. In alkaline cell 100 any portion of the housing 70 can form the positive terminal. Preferably, the positive terminal is pip (surface protrusion) 76 located at the closed end 74 of housing 70. Insulating disk 150 has a midsection region 154 located between boss 151 and peripheral edge 155. A circumferential skirt 157 extends downwardly from peripheral edge 155 to end 157A. Skirt 157 may be continuous, circumventing the inside surface of casing 70. Preferably skirt 157 is discontinuous thus forming a plurality of individual legs 157 (FIGS. 1, 2A and 3) which are desirably spaced apart from each other at equal distances. Preferably there are four legs 157 (FIG. 2A) which are equally spaced from each other and extending downwardly away from the peripheral edge 155 of insulating disk 150. Each leg 157 may desirably be identical and extends towards the cell interior to a level below the plane of the bottom surface 159 of boss 151. The individual spaced apart legs have been determined to provide added flexibility to the insulating disk so that it may better withstand radial compressive forces applied during crimping and build-up of gas pressure from within the cell, without cracking.

Figure 2A:
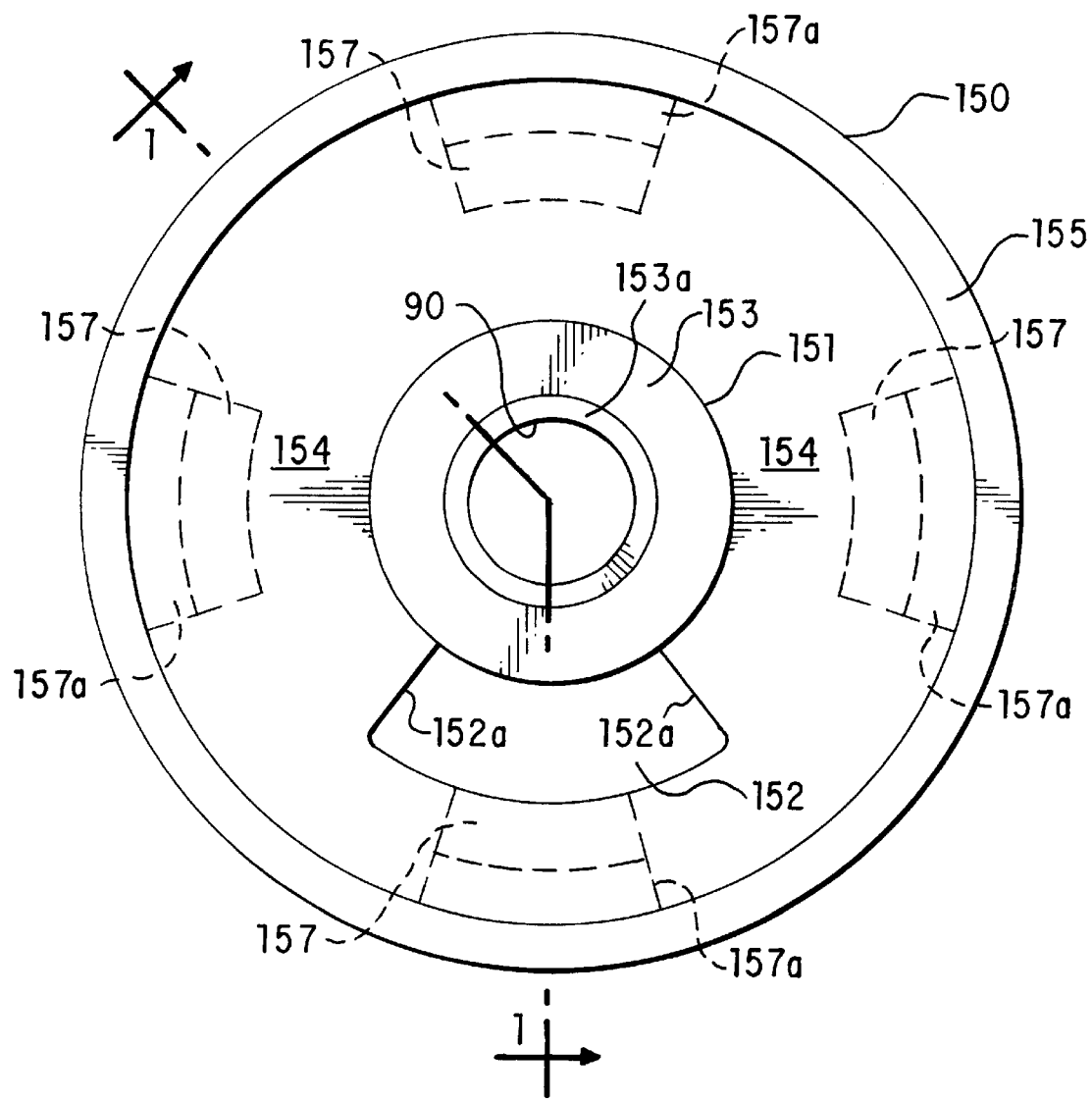
FIG. 2A is a top plan view of the insulating disk showing a rupturable membrane therein.

There is a portion 77 of housing 70 below indent 75 Preferably there is a space 73 between the outer surface of leg 157 and the inside surface of housing 70. Thus, the outer surface of leg 157 below indent 75 generally does not contact cell housing 70 and does not form a snap fit around circumferential indent 75. This permits easy insertion of the peripheral edge 155 of disk 150 onto circumferential indent 75 during cell assembly. That is, only small amount of force is needed to insert peripheral edge 155 of disk 150 onto circumferential indent 75, since it is preferably not snap fitted around indent 75. (Snap fit occurs if the maximum outside diameter of a portion of the circumferential skirt or leg 157 below circumferential indent 75 is greater than the cell inside diameter in the plane of said circumferential indent 75. Conversely, snap fit within the housing does not occur if the maximum outside diameter of the circumferential skirt or leg 157 below said circumferential indent 75 is less than the cell inside diameter in the plane of said indent 75, as in the embodiment illustrated in FIGS. 1 and 2.) Leg 157 provides additional structural support to insulating disk 150 and allows greater radial forces to be applied to insulating disk 150 during crimping of the top portion 71 of the cell housing around said sealing disk. Midsection 154 of insulating disk 150 has at least one integral thinned portion 152 which forms a rupturable membrane, oriented preferably perpendicular to the cell's longitudinal axis 190. Rupturable membrane 152 may desirably be in the configuration of a truncated sector of a circle or a circle which lies between leg 157 and boss 151 (FIGS. 1 and 2A). Rupturable membrane 152 may be of other shape, for example, oval, rectangular, parallelepiped or polygonal. Alternatively, rupturable membrane 152 may be in the form of straight or curved grooves forming a thin rupturable region within a portion of insulating disk 150. Rupturable membrane 152 is advantageously formed during the molding of insulating disk 150, preferably by injection molding.

It has been determined that the end cap assembly 10, even though it does not contain a separate metal support disk, i.e., apart from the end cap 200, provides a sufficiently tight seal even though the cell may be subjected to extremes in hot or cold ambient conditions, for example, between about −29° C. and 71° C. The curved rib 215 at the edge of the end cap functions as radial spring wherein sufficient radial forces are maintained to provide a tight seal even though the cell may be exposed to extremes in hot and cold ambient conditions. With very small diameter cells, having a diameter less than the diameter of AAA cells, particularly AAAA size cells, end cap 200 with curved rib 215 along its edge together with insulating disk 150, preferably with plurality of spaced apart legs 157, allows the end cap assembly to withstand sufficient radial compression so that a tight seal is maintained at all times.

The end cap assembly 10 (FIGS. 1 and 2) may be assembled from the individual components (FIG. 3) by first welding the head 85 of current collector 80 to the inside surface of central portion 205 of end cap 200. Current collector 80 is then inserted downwardly through aperture 90 within boss 151. Boss 151 may initially be provided with a thin wall at the base of aperture 90 such that aperture 90 does not initially run completely through boss 151. In such case the thin wall is punctured as the current collector is forced through aperture 90, thereby providing a friction fit between current collector 80 and the wall defining aperture 90. Aperture 90 may also initially be of slightly smaller diameter than the diameter of current collector 80. This enhances the friction fit between the current collector 80 and the wall defining aperture 90. The current collector 80 is pushed through aperture 90 until head 85 of the current collector comes to rest against the top surface 153 of boss 151 (FIG. 1). As current collector 80 is pushed through aperture 90, the peripheral edge 222 of end cap 200 comes to rest against the inside surface of peripheral edge 155 of insulating disk 150.

Plastic insulating disk 150 with attached current collector 80 and end cap 200 may then be inserted into the open end 79 of a cylindrical housing 70. Housing 70 has a circumferential indent in its surface forming circumferential step 75 near the open end 79. The insulating disk 150 has a circumferential groove 156 around the outside surface of its peripheral edge 155 (FIGS. 1 and 3). Insulating disk 150 is inserted so that groove 156 rests on circumferential step 75 which forms a seat for insulating disk 150. A portion 158a of insulating disk 150 comes to rest above step 75 and a portion 158b of the insulating disk 150 comes to rest below groove 75. Housing 70 is initially formed so that it has an enlarged portion 71 at the open end 79. That is, the diameter of housing 70 at open end 79 is initially larger than the diameter of the rest of the housing.

The enlarged portion 71 of housing 70 is first radially compressed around the peripheral edge 155 of insulating disk 150 until the inside surface of housing portion 71 presses very firmly against the upper portion 158a of peripheral edge 155. During radial crimping curved rib 215 compresses inwardly while the flat section 205 of end cap 200 and legs 157 of insulating disk 150 move slightly downwardly in the direction of the cell interior. The downward movement of flat section 205 of end cap 200 causes head 85 of current collector 80 to press firmly against the top surface 153 of boss 151. Radial crimping causes the peripheral edge 222 of end cap 200 to bite into the inside surface of peripheral edge 155 of insulating disk 150 forming a tightly compressed seal between end cap 200 and the peripheral edge 155 of insulating disk 150. The peripheral edge 72 of cell housing 70 may then be crimped over the peripheral edge 155 of insulating disk 150 to form a cell shoulder. Preferably the peripheral edge 72 of cell housing 70 may be crimped over edge 155 of insulating disk 150 in two steps, a partial crimping step and a final crimping step. The first step may be a partial crimp wherein the peripheral edge 72 is partially crimped, e.g. less than about 90° movement from vertical, over edge 155, and then in a second step (final crimping) the crimp of peripheral edge 72 over edge 155 may be completed so that both edge 72 and edge 155 are forced into a horizontal position (i.e., 90° from longitudinal axis 190) as shown in FIG. 1. Such crimping methods are described in U.S. Pat. No. 4,537,841 herein incorporated by reference. The radial compression of housing 70 around peripheral edge 155 and then partial crimping of peripheral edge 72 (less than 90° from vertical) of the cell housing over peripheral edge 155 of 150 may desirably be accomplished in one continuous motion using the same die, with the radial crimping preferably done first. The final crimping step may desirably be accomplished in a separate step using a punch to force peripheral edge 72 and edge 155 into horizontal position. It is desirable to accomplish the radial compression of enlarged portion 71 of housing 70 around peripheral edge 155 first, as above described, since less vertical force is then required when edge 72 of housing 70 is crimped over peripheral edge 155. After crimping, the peripheral edge 155 of disk 150 insulates housing portion 71 from end cap 200. When gas pressure within the cell reaches a predetermined level, membrane 152 ruptures allowing gas to escape to the environment through vent holes 250 in end cap 200.

Insulating disk 150 and integral rupturable membrane 152 may be composed of a durable, corrosion resistant plastic.

Insulating disk 150 and integral rupturable membrane 152 is desirably composed of a polyamide (nylon), preferably nylon 66 (polyhexamethyleneadipamide) or nylon 612 (polyhexamethylenecebacamide), more preferably nylon 612. Alternatively, insulating disk 150 and membrane 152 may be composed of polypropylene, talc filled polypropylene, sulfonated polyethylene or other polyamide (nylon) grades. However, nylon 66 or nylon 612 have been determined to be more desirable materials for insulating disk 150 and membrane 152 in an AAAA alkaline cell 100. These materials are more desirable because they are durable, but yet softer than filled polymer such as talc filled polypropylene. Nylon 66 or nylon 612 also exhibits less creep than unfilled or filled polypropylene at all temperatures to which the cell may be exposed during normal operation. The insulating disk 150 formed of the softer material, namely, nylon 66 or nylon 612 allows peripheral edge 72 of housing 70 to be crimped over peripheral edge 155 of disk 150 with generally less force than would be required if filled polymeric material such as talc filled polypropylene were employed. This has been determined to result in easier and more reliable sealing of the very small diameter AAAA cell 100. Nylon 612 is the more preferred material for insulating disk 150 because it absorbs less moisture and is more chemically resistant and more resistant to cracking. Insulating disk 150 has a diameter corresponding to the inside diameter of cell housing 70. For cells less than AAA size, the diameter of insulating disk 150 is less than 10 mm, typically between about 7 and 9 mm. Specifically, for AAAA size cells the diameter of insulating disk 150 is between about 7.6 and 8.2 mm and its overall thickness is between about 3 and 5 mm, preferably about 4 mm.

Housing 70 may preferably be nickel plated steel. End cap 200 is constructed of a conductive metal having good mechanical strength and corrosion resistance such as nickel plated cold rolled steel or stainless steel, preferably, nickel plated low carbon steel. Current collector 80 can be selected from a variety of known electrically conductive metals found to be useful as current collector materials, for example, brass, tin plated brass, bronze, copper or indium plated brass. To enhance the seal between insulating disk 150 and housing 70, a conventional water resistant sealing paste may be applied such as an asphalt based sealant, e.g., comprising bitumen and a suitable aromatic solvent, e.g. toluene. Alternatively, the sealant may be a tacky polyamide sealant. The sealing paste may be applied to the outer wall of peripheral edge 155 of insulating disk 150 or to the inside surface of housing 70 before the insulating disk 150 is inserted into the open end of housing 70. The same sealant may also be applied to the wall forming aperture 90 or to the outside surface of current collector 80 before the current collector 80 is inserted into aperture 90.

In a preferred embodiment the insulating disk 150 may be formed of nylon 66 or nylon 612, and membrane 152 may be in the configuration of a truncated sector of a circle (FIG. 2A). If the membrane 152 is in the form of a truncated sector (FIG. 2A), its sides 152a may desirably form an angle between about 45 and 90 degrees. The width of the truncated sector 152 (measured radially) may be between about 0.25 and 3.0 millimeters; and the thickness of sector 152 may be between about 0.03 and 0.2 millimeters. Such range allows membrane 152 to rupture when the cell internal gas pressure reaches a level between about 500 and 2000 psig ($3.45 \times 10^{+6}$ and $13.8 \times 10^{+6}$ pascal gage). If the rupturable membrane 152 is in the shape of a truncated sector (FIG. 2A), a preferred width (measured radially) of membrane 152 may be about 1.0 millimeter and a preferred thickness of membrane 152 may be 0.08 millimeters. The sides 152a may preferably form an angle of 75 degrees. In such design, membrane 152 will rupture when the AAAA cell internal pressure reaches about 1100 psig ($7.6 \times 10^{+6}$ pascal). In another preferred embodiment membrane 152 may be of circular configuration having a diameter between about 1 and 2 millimeters and a thickness between about 0.03 and 0.2 millimeters. Such range allows membrane 152 to rupture when the cell internal gas pressure reaches a level between about 500 and 2000 psig ($3.45 \times 10^{+6}$ and $13.8 \times 10^{+6}$ pascal gage). With membrane 152 of circular configuration a specific thickness may be about 0.08 mm and its diameter about 1.5 mm. In such design, membrane 152 will rupture when the AAAA cell internal pressure reaches about 1100 psig ($7.6 \times 10^{+6}$ pascal). (The pressure at which rupture occurs increases as membrane thickness is increased and decreases as membrane diameter is increased.) It is believed that a single rupturable membrane 152 within insulating disk 150 is sufficient to effect rupture at the desired level of internal pressure. However, it should be appreciated that insulating disk 150 may be provided with a plurality of isolated rupturable membranes as an added safety feature to assure that rupture occurs at the desired level of cell pressure.

Although the present invention has been described with respect to specific embodiments, it should be appreciated that variations are possible within the concept of the invention. Accordingly, the invention is not intended to be limited to the specific embodiments described herein but rather its scope is reflected by the claims and equivalents thereof.

What is claimed is:

1. In an alkaline electrochemical cell, said cell having an open ended cylindrical cell housing and an end cap assembly inserted therein closing said housing, said cell having a positive and a negative terminal, the improvement comprising:

the end cap assembly comprising an end cap, and an insulating sealing disk underlying said end cap, an elongated current collector penetrating through an aperture in said insulating sealing disk, wherein at least a portion of said insulating sealing disk lies within said cell housing, wherein said insulating sealing disk comprises a central portion and an upward extending peripheral edge when the cell is viewed in vertical position with the end cap on top, wherein said end cap comprises an edge which abuts the inside surface of said peripheral edge of the insulating sealing disk and the outside surface of said upwardly extending peripheral edge abuts the inside surface of said housing at the open end thereof, wherein said insulating disk comprises a discontinuous skirt comprising a plurality of integral legs emanating downwardly into the cell interior from the peripheral edge of said insulating disk, wherein said end cap functions as a cell terminal, wherein the edge of said housing at the open end thereof is crimped over the peripheral edge of said insulating sealing disk, wherein said cylindrical cell housing is an AAAA or LR61 size and wherein said end cap assembly does not include a metal disk other than said end cap within any portion of said cell housing at the open end thereof, wherein said housing has a circumferential indent in its surface, and when the cell is viewed in vertical position with the end cap on top a portion of the peripheral edge of said insulating disk rests on said indent and said discontinuous skirt is below said indent, wherein the outside surface of said discontinuous skirt does not contact the inside surface of said cell housing, and said insulating disk does not form a snap fit around said indent.

2. The electrochemical cell of claim 1 wherein the end cap comprises a flat central portion and a downwardly extending wall angled outwardly from vertical and extending away from said central portion, said downwardly extending wall terminates in an inwardly curved (concave) rib when the cell is viewed while looking down with the end cap on top, said inwardly curved rib terminates in an upwardly extending wall terminating in said end cap edge abutting the inside surface of the peripheral edge of said insulating disk.

3. The electrochemical cell of claim 2 wherein the central portion of said insulating sealing disk comprises an integral boss having an aperture therethrough for insertion of said current collector and wherein said end cap edge bites into the inside surface of the peripheral edge of said insulating disk.

4. The electrochemical cell of claim 3 wherein said insulating disk comprises a midsection region extending radially from said boss and located between said boss and said upwardly extending peripheral edge, said midsection region comprising an integral rupturable membrane portion therein, wherein said membrane ruptures when gas pressure within the cell reaches a predetermined level.

5. The electrochemical cell of claim 4 wherein said rupturable membrane portion forms an island within a portion of said midsection.

6. The electrochemical cell of claim 5 wherein said rupturable membrane has a circular or oval configuration.

7. The electrochemical cell of claim 5 wherein said rupturable membrane has the configuration of a truncated sector of a circle.

8. The electrochemical cell of claim 5 wherein said rupturable membrane has a polygonal configuration.

9. The electrochemical cell of claim 3 wherein said end cap assembly further comprises a sealant material comprising bitumen material between the peripheral edge of said insulating sealing disk and said housing.

10. The electrochemical cell of claim 3 wherein a portion of the housing at the open end thereof is radially compressed against the peripheral edge of said insulating sealing disk, whereupon the central portion of said end cap and the legs of said insulating disk move downwardly in the direction of the cell interior.

11. The electrochemical cell of claim 10 wherein said skirt comprises at least four legs extending away from the peripheral edge of said insulating disk.

12. The electrochemical cell of claim 11 wherein an end of said current collector is welded to said flat central portion of said end cap.

13. The electrochemical cell of claim 11 wherein said legs extending away from the peripheral edge of said insulating disk are equally spaced from each other.

14. The electrochemical cell of claim 5 wherein said rupturable membrane is a truncated sector of a circle having a width (measured radially) between about 0.25 and 3.0 millimeters, and the sides of said truncated sector form an angle of between about 45 and 90 degrees.

15. The electrochemical cell of claim 3 wherein said insulating sealing disk comprises polyhexamethyleneadipamide.

16. The electrochemical cell of claim 3 wherein the insulating sealing disk comprises nylon 612 polyhexamethylenecebacamide.

17. The electrochemical cell of claim 3 wherein AAAA or LR61 cell housing has an outside diameter of between about 7.7 and 8.3 millimeters.

18. The electrochemical cell of claim 3 wherein the insulating sealing disk has an overall thickness of between about 3 and 5 mm and a diameter of between about 7.6 and 8.2 mm.

19. The electrochemical cell of claim 18 wherein the rupturable membrane within said insulating sealing disk has a thickness of between about 0.03 and 0.2 mm.

20. In an alkaline electrochemical cell, said cell having an open ended cylindrical cell housing and an end cap assembly inserted therein closing said housing, said cell having a positive and a negative terminal, the improvement comprising:

said cylindrical cell housing having a diameter less than the diameter of an AAA size cell housing, the end cap assembly comprising an end cap, and an insulating sealing disk underlying said end cap, an elongated current collector penetrating through an aperture in said insulating sealing disk, wherein at least a portion of said insulating sealing disk lies within said cell housing, wherein said insulating sealing disk comprises a central portion and an upward extending peripheral edge when the cell is viewed in vertical position with the end cap on top, wherein said end cap comprises an edge which bites into the inside surface of said peripheral edge of the insulating sealing disk and the outside surface of said upwardly extending peripheral edge abuts the inside surface of said housing at the open end thereof, wherein said insulating disk comprises a discontinuous skirt comprising a plurality of integral legs emanating downwardly into the cell interior from the peripheral edge of said insulating disk, wherein said end cap functions as a cell terminal, wherein the edge of said housing at the open end thereof is crimped over the peripheral edge of said insulating sealing disk, wherein said end cap assembly does not include a metal disk other than said end cap within any portion of said cell housing at the open end thereof, wherein said housing has a circumferential indent in its surface, and when the cell is viewed in vertical position with the end cap on top a portion of the peripheral edge of said insulating disk rests on said indent and said discontinuous skirt is below said indent, wherein the outside surface of said discontinuous skirt does not contact the inside surface of said cell housing, and said insulating disk does not form a snap fit around said indent.

21. The electrochemical cell of claim 20 wherein the end cap comprises a flat central portion and a downwardly extending wall angled outwardly from vertical and extending away from said central portion, said downwardly extending wall terminates in an inwardly curved (concave) rib when the cell is viewed while looking down with the end cap on top, said inwardly curved rib terminates in an upwardly extending wall terminating in said end cap edge biting into the inside surface of the peripheral edge of said insulating disk.

22. The electrochemical cell of claim 21 wherein the central portion of said insulating sealing disk comprises an integral boss having an aperture therethrough for insertion of said current collector.

23. The electrochemical cell of claim 22 wherein said insulating disk comprises a midsection region extending radially from said boss and located between said boss and said upwardly extending peripheral edge, said midsection region comprising an integral rupturable membrane portion therein, wherein said membrane ruptures when gas pressure within the cell reaches a predetermined level.

24. The electrochemical cell of claim 23 wherein said rupturable membrane portion forms an island within a portion of said midsection.

25. The electrochemical cell of claim 24 wherein said rupturable membrane has a circular or oval configuration.

26. The electrochemical cell of claim 24 wherein said rupturable membrane has the configuration of a truncated sector of a circle.

27. The electrochemical cell of claim 20 wherein said alkaline cell housing has a diameter between about 7 and 9 millimeters.

28. The electrochemical cell of claim 20 wherein said cell housing is an AAAA or LR61 size having an outside diameter of between about 7.7 and 8.3 millimeters.

29. The electrochemical cell of claim 20 wherein the insulating sealing disk comprises polyhexamethyleneadipamide.

30. The electrochemical cell of claim 20 wherein the insulating sealing disk comprises polyhexamethylenecebacamide.

31. The electrochemical cell of claim 22 wherein the insulating sealing disk has an overall thickness of between about 3 and 5 mm and a diameter of between about 7.6 and 8.2 mm.

32. The electrochemical cell of claim 24 wherein the insulating sealing disk has an integral rupturable membrane having a thickness of between about 0.03 and 0.2 mm.

33. The electrochemical cell of claim 20 wherein a portion of the housing at the open end thereof is radially compressed against the peripheral edge of said insulating sealing disk, whereupon the central portion of said end cap and the legs of said insulating disk move downwardly in the direction of the cell interior.

* * * * *